Figure 1:
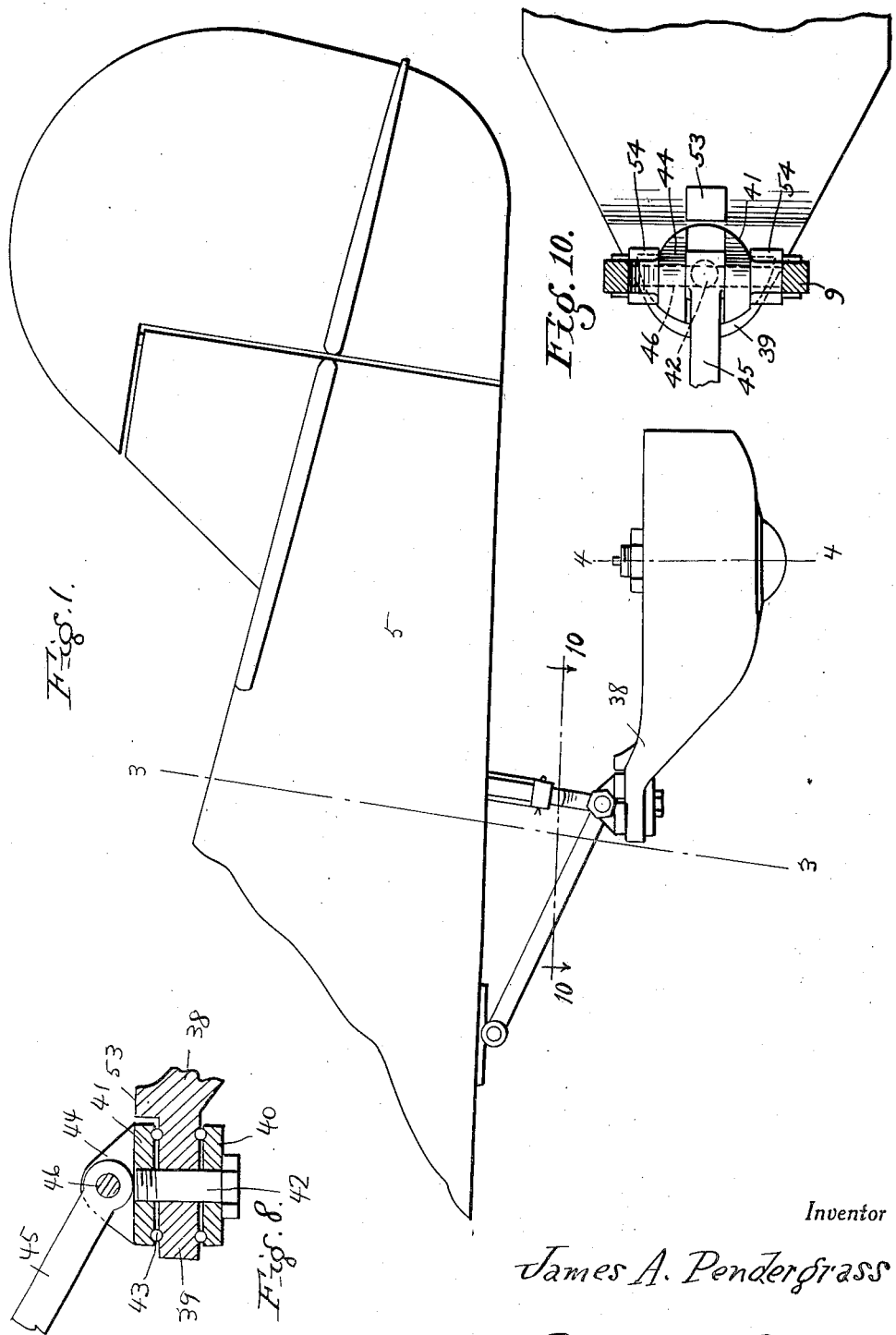

Jan. 21, 1930.    J. A. PENDERGRASS    1,744,572
TAIL SKID FOR AIRCRAFT
Filed April 24, 1929    4 Sheets-Sheet 3

Inventor
James A. Pendergrass

By Clarence A. O'Brien
Attorney

Jan. 21, 1930.  J. A. PENDERGRASS  1,744,572
TAIL SKID FOR AIRCRAFT
Filed April 24, 1929   4 Sheets-Sheet 4
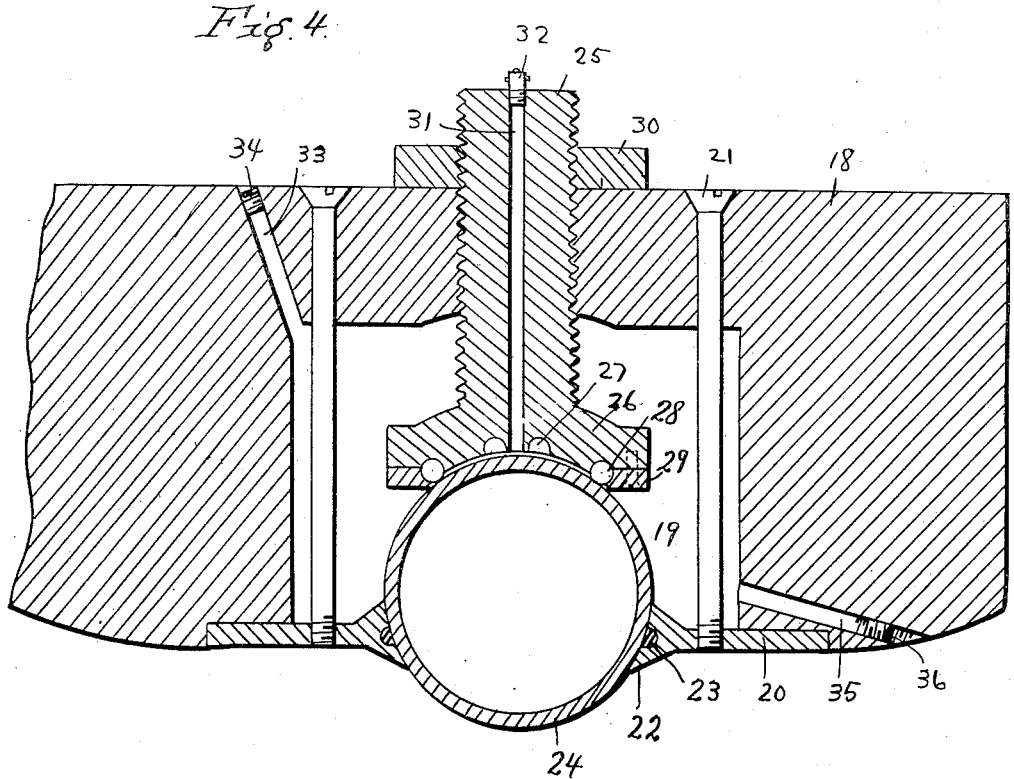
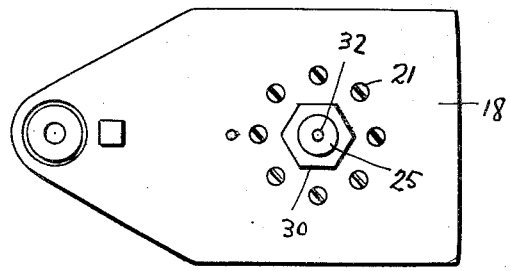
Inventor
James A. Pendergrass
By Clarence A. O'Brien,
Attorney Patented Jan. 21, 1930

1,744,572

UNITED STATES PATENT OFFICE

JAMES A. PENDERGRASS, OF FRANKLIN FURNACE, OHIO

TAIL SKID FOR AIRCRAFT

Application filed April 24, 1929. Serial No. 357,819.

The present invention relates to a tail skid for aircraft and has for its prime object to provide a structure of this nature having means incorporated in the mounting thereof whereby the skid is free to swing from side to side thereby enabling the aircraft to be more readily and easily maneuvered on the ground for various obvious purposes.

Another very important object of the invention resides in the provision of a tail skid of this nature having incorporated therein a ball for engaging the ground.

Another very important object of the invention resides in the provision of a tail skid of this nature which has incorporated in its structure shock absorbing features.

A still further very important object of the invention resides in the provision of a novel skid of this nature which is comparatively simple in its construction, strong and durable, thoroughly efficient and reliable in use, and otherwise well adapted for the purpose for which it is designed.

With the above and numerous other objects in view as will appear as the description proceeds, the invention resides in certain novel features of construction, and in the combination and arrangement of parts as will be hereinafter more fully described and claimed.

Figure 2:
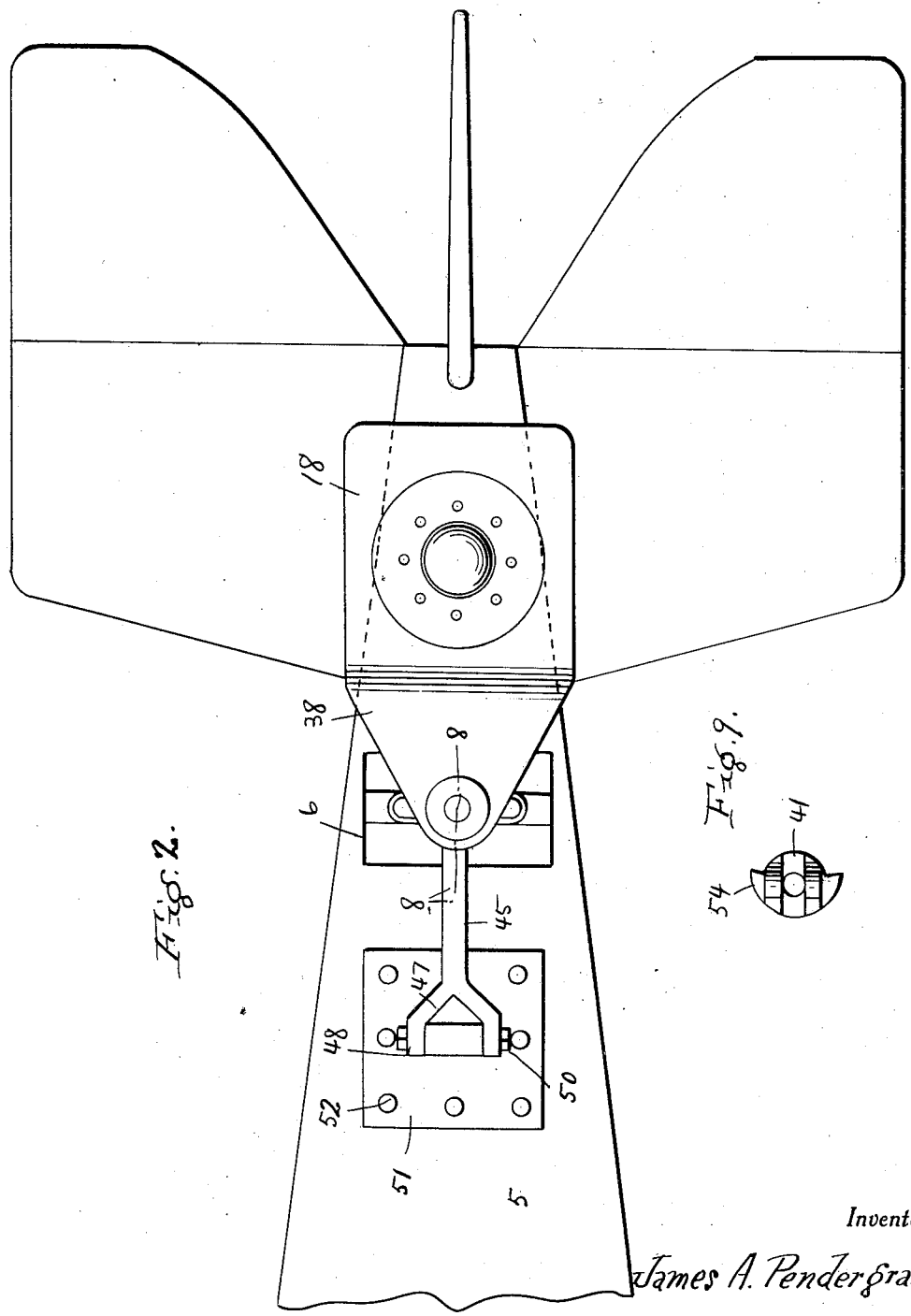
Figure 3:
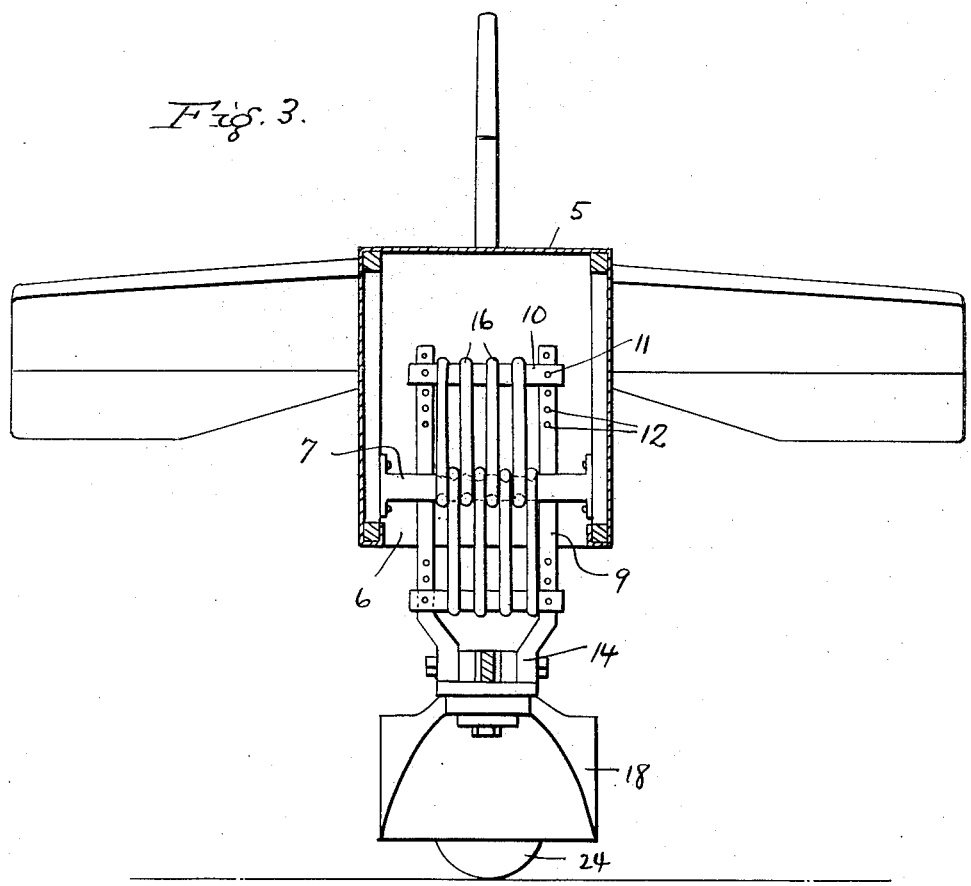
Figure 6:
Figure 7:
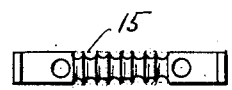

In the drawing:

Figure 1 is a fragmentary side elevation of an aeroplane showing the tail thereof with my improved skid structure associated therewith, Figure 2 is a bottom plan view thereof, Figure 3 is a sectional view taken substantially on the line 3—3 of Figure 1, Figure 4 is an enlarged detail section through the skid taken substantially on the line 4—4 of Figure 1, Figure 5 is a top plan view of the skid, Figure 6 is a detail elevation of the stationary cross bar forming part of the shock absorbing mechanism, Figure 7 is a similar view of one of the movable cross bars thereof, Figure 8 is a detail section taken substantially on the line 8—8 of Figure 2, and Figure 9 is a top plan view of the upper plate of the connection between the skid and the shock absorbing means.

Figure 10 is a section taken substantially on line 10—10 of Figure 1.

Referring to the drawing in detail it will be seen that the numeral 5 denotes the tail portion of a fuselage which is provided with an opening 6 in the lower portion thereof as is clearly illustrated in Figure 3. A cross bar 7 is anchored in the tail 5 above the opening 6 and has a plurality of upper and lower grooves 8 alternately arranged in respect to each other.

A pair of vertical bars 9 are connected to cross bars 10 by bolts 11 or other suitable means, the bars 9 being provided with series of openings 12 so that the cross bars 10 may be mounted different distances apart from each other. The lower ends of the bars 9 converge downwardly toward each other and terminate in ears 14.

The cross bars 10 are provided with annular grooves. A plurality of elastic bands are disposed about the bars 10 and 7 and the normal tension on these elastic bands is controlled by the adjustment of the bars 10 in respect to the bars 9 as will be quite apparent.

Thus the frame formed by the bars 9 and 10 is mounted on the bar 7 by the elastic band 16. The numeral 18 denotes the block like skid body with a cavity 19 formed in the central bottom portion thereof and a plate 20 is mounted across the bottom end of the cavity being held in place by bolts 21.

The central portion of the plate 20 is provided with an opening 22 in the wall of which are anti-friction means 23. A ball 24 disposed in the cavity 19 partly projects through the opening 22. The thrust shank 25 is threaded through the top of the block like body 18 to extend into the cavity and terminate in a head 26 which has recesses therein for anti-friction bearings 27 and 28 the latter of which are held in place by plate 29.

This thrust bearing head 26 with its anti-friction elements 27 and 28 engage the upper portion of the ball 24. A lock nut 30 is engaged on the outer or upper end of the thrust shank 25. The thrust shank 25 is provided with a longitudinally extending bore 31 and in the upper end thereof is a nipple 32.

A passage 33 leads to the top of the cavity 19 and has a nipple 34 therein. A drain passage 35 leads from the lower portion of the cavity sidewardly and downwardly and has a detachable plug 36 therein.

The cavity is filled with grease through the nipple 34 and passage 33. This grease may be cleaned or drained out through the passage 35 by removing the plug 36 when this may be desired. The forward end of the block like body 18 merges into an upwardly and forwardly inclined and tapering extension 38 the end of which terminates in a plate 39 disposed between plates 40 and 41 the former below and the latter above the plate 39. A bolt 42 extends through openings in the plates 39 and 41 and anti-friction means 43 are disposed betweeen the plates 39 and 41 and 39 and 40.

The plate 41 is provided with a pair of upstanding parallel spaced ears 44 which are straddled by the ears 14. A brace bar 45 has one end between the ears 44 and a bolt 46 extends through openings in the ears 14, ears 44, and said end of the brace bar 45. The other end of the brace bar 45 is bifurcated as is indicated at 47 to terminate in a pair of ears 48 to straddle a bearing 49 so that bolts 50 may pivotally engage the furcations 47 with the bearing 49.

The bearing 49 is formed on a plate 51 secured as at 52 to the bottom of the tail 5 in advance of the opening 6. At the upper end of the extension 28 there rises a stop plug 53 and laterally from the plate 41 extend a pair of stop lugs or shoulders 54, with which the lug 53 is adapted to abut when the skid swings to one side or the other thereby limiting the lateral swinging movement of the ship.

From the above detailed description it will be quite apparent that I have devised a tail skid for aeroplanes and other aircraft whereby said aircraft may be easily and readily maneuvered on the ground either under the power of the aircraft or pushed manually.

Thus the air craft may be taken out and put in a hangar with considerable ease and may be placed in position on the ground in the proper manner as may be desirable under different conditions. It will further be seen that in landing the shock absorbing mechanism comes into play and forms very important safety features and eliminates considerable strain from the fuselage.

It is thought that the construction, utility and advantages of this invention will now be quite apparent to those skilled in this art without a more detailed description thereof.

The present embodiment of this invention has been disclosed in considerable detail merely for the purposes of exemplification since in actual practice it attains the features of advantage enumerated as desirable in the statement of the invention and the above description.

It is apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. A tail skid of the class described comprising a body with a cavity in the bottom thereof, a plate across the bottom of the cavity having a central opening, means for holding the plate on the body, a ball in the cavity and partially projecting through the opening, a thrust bearing shank threaded through the top of the body terminating in the cavity in a head, anti-friction means on the head to engage the ball.

2. A tail skid of the class described comprising a body with a cavity in the bottom thereof, a plate across the bottom of the cavity having a central opening, means for holding the plate on the body, a ball in the cavity and partially projecting through the opening, a thrust bearing shank threaded through the top of the body terminating in the cavity in a head, anti-friction means on the head to engage the ball, said shank being provided with a central longitudinal bore leading to the ball and having in its outer end a grease nipple.

3. A tail skid of the class described comprising a body with a cavity in the bottom thereof, a plate across the bottom of the cavity having a central opening, means for holding the plate on the body, a ball in the cavity and partially projecting through the opening, a thrust bearing shank threaded through the top of the body terminating in the cavity in a head, anti-friction means on the head to engage the ball, said shank being provided with a central longitudinal bore leading to the ball and having in its outer end a grease nipple, said body being provided with a passage leading down from the top thereof to the top of the cavity and a grease nipple therein.

4. A tail skid of the class described comprising a body with a cavity in the bottom thereof, a plate across the bottom of the cavity having a central opening, means for holding the plate on the body, a ball in the cavity and partially projecting through the opening, a thrust bearing shank threaded through the top of the body terminating in the cavity in a head, anti-friction means on the head to engage the ball, said shank being provided with a central longitudinal bore leading to the ball and having in its outer end a grease nipple, said body being provided with a passage leading down from the top thereof to the top of the cavity and a grease nipple therein, said body being provided with a drain passage leading from the lower portion of the cavity through the bottom of the body and a plug therein.

5. In combination with the tail of a fuselage wherein said tail is provided with an opening in the bottom thereof, a skid, shock absorbing means in the tail and extending through the opening and operatively connected with the skid, said shock absorbing means comprising a frame with end cross bars, a stationary cross bar in the fuselage, an elastic band disposed about the stationary bar and the cross bars of the frame.

6. In combination with the tail of a fuselage wherein said tail is provided with an opening in the bottom thereof, a skid, shock absorbing means in the tail and extending through the opening and operatively connected with the skid, said shock absorbing means comprising a frame with end cross bars, a stationary cross bar in the fuselage, an elastic band disposed about the stationary bar and the cross bars of the frame, a brace bar pivotally connected with the bottom of the tail forwardly of its opening and pivotally connected with the forward end of the skid.

7. In combination with the tail of a fuselage wherein said tail is provided with an opening in the bottom thereof, a skid, shock absorbing means in the tail and extending through the opening and operatively connected with the skid, said shock absorbing means comprising a frame with end cross bars, a stationary cross bar in the fuselage, an elastic band disposed about the stationary bar and the cross bars of the frame, a brace bar pivotally connected with the bottom of the tail forwardly of its opening and pivotally connected with the forward end of the skid, said means for connecting the skid with the shock absorbing means comprising a pair of plates for receiving the front extremity of the skid therebetween so as to allow the skid to swing from side to side and means incorporated in one of the plates and the forward end of the skid to limit the side swinging movement thereof.

In testimony whereof I affix my signature.

JAMES A. PENDERGRASS.